Figure 1:
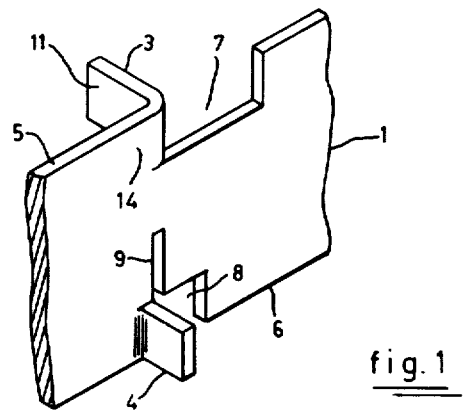

United States Patent [19]

Piepers et al.

[11] 4,007,899
[45] Feb. 15, 1977

[54] LATTICE CONSTRUCTION

[75] Inventors: Gijsbrecht Gerhardus Piepers, Heiloo; Christiaan Gustaaf Adolf Scholtus, Alkmaar, both of Netherlands

[73] Assignee: Reactor Centrum Nederland, The Hague, Netherlands

[22] Filed: Mar. 13, 1974

[21] Appl. No.: 450,863

Related U.S. Application Data

[62] Division of Ser. No. 238,286, March 27, 1972, Pat. No. 3,886,438.

[30] Foreign Application Priority Data

Mar. 26, 1971 Netherlands .................... 7104076

[52] U.S. Cl. .................... 248/49; 165/162; 176/78; 248/68 R
[51] Int. Cl.² .................... E04C 2/42
[58] Field of Search .............. 176/76, 78; 248/49, 248/68 R; 403/346; 165/162; 52/668

[56] References Cited

UNITED STATES PATENTS

| 1,022,387 | 4/1912 | Czimeg | 403/346 |
| 2,782,696 | 2/1957 | Francis et al. | 52/668 |
| 3,314,860 | 4/1967 | Wilman | 176/78 |
| 3,389,451 | 6/1968 | Speca et al. | 52/668 X |
| 3,423,287 | 1/1969 | Anthony et al. | 176/78 |
| 3,431,171 | 3/1969 | Glandin | 176/78 |
| 3,646,994 | 3/1972 | Piepers et al. | 165/162 X |
| 3,674,635 | 7/1972 | Anthony et al. | 176/78 |

FOREIGN PATENTS OR APPLICATIONS 2,001,327 9/1970 Germany .................... 176/76

Primary Examiner—Roy D. Frazier
Assistant Examiner—Rodney H. Bonck
Attorney, Agent, or Firm—Cushman, Darby & Cushman

[57] ABSTRACT

Lattice, especially for supporting sideways a bunch of nuclear fuel rods, constructed according to the egg-crate principle, in which fixing lips of alternating different lengths are stamped and bend out of the bands and cross-bands from which the lattice is composed, and are spotwelded to these bands.

4 Claims, 15 Drawing Figures

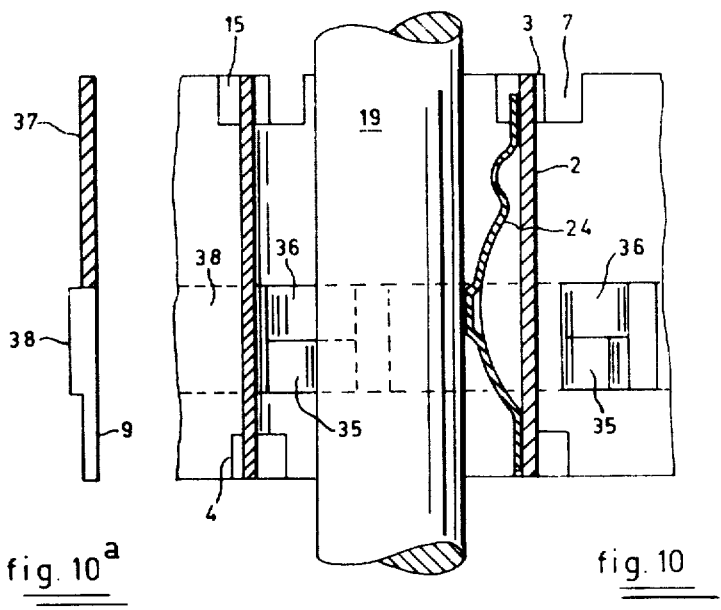
fig. 10ᵃ    fig. 10
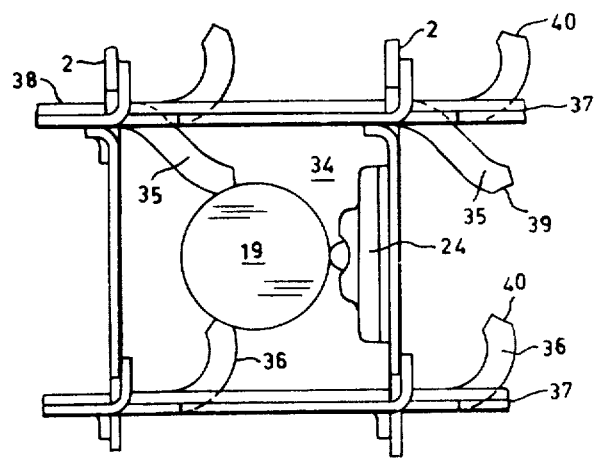
fig. 11

LATTICE CONSTRUCTION

This is a division of application Ser. No. 238,286 filed Mar. 27, 1972, and now U.S. Pat. No. 3,889,438.

SUMMARY

The invention offers a construction method consisting of a simple welding process, needing only very few different parts. Bands and cross - bands are of the same shape. Stiff spacer lips may be stamped out of a thicker part of the bands, making them suitable for tip - contour - forming by grinding or spark - erosion.

The invention relates to a lattice specially adapted to support a bunch of elongated components participating in a heat-exchange process, which lattice is made up of comb-like strips or bands in such a way as to form compartments surrounded by intersecting bands which, having comb-like incisions positioned half-way over the band, engage each other in the manner of bands and cross-bands.

Lattices of this kind have in the past proved to be so complicated that their manufacture became very time-consuming and hence costly.

According to the invention a lattice of this kind is therefore executed in such a way that the edges of these bands are provided on either side with fixing lips bent into the plane of the lattice and stamped out of the edge of the band, by means of which fixing lips the intersecting bands are fixed to each other. The most expedient fixing is obtained in that the fixing of a lip to a cross-band is effected by the spot welding process.

In this way it is rendered possible to build up a lattice by means of a simple welding process, whilst at the same time the number of parts can be kept comparatively small as compared with the usual spot welding constructions in which the strips or bands are joined to each other with U-shaped connecting pieces. These latter connecting pieces have, moreover, shown in practice the drawback that they easily get bent out of shape.

The most practical manner of making these comb strips engage with each other in such a way that at the same time the fixing points for spot welding are positioned over each other, is afforded if the lips of a comb strip at oppositely situated edges are bent outwards in opposite directions. This is best effected in that oppositely situated lips are bent outwards into planes which are directly adjacent to the walls of a comb-like incision.

In order to ensure that the surface which is available for fixing (preferably spot weld fixing) is large enough at all positions, the lips are made longer at one edge of the comb strip than the lips situated at the other edge.

It is found that the comb strips produced in this way are of such a form that the same kind of strip will serve for all the bands that are positioned in the interior of a lattice.

Assembly is effected in that at least two sets of mutually parallel comb strips are slid into each other in such a way that the comb strips of one set (all of which run parallel to each other per set) are in opposite orientation with respect to the comb strips of the other set. Thus, in one set the long, outwardly bent lips are at the top edge, whilst in the other set they are at the bottom edge of the strip.

In order to keep the fissile rods clamped in position within the meshes of the lattice, care is taken that in at least one set of parallel bands, between each set of comb-like incisions, a pair of extension lips are bent outwards on either side in order to serve respectively as spacer and as pressure spring in the compartments.

According to a preferred embodiment one set of parallel bands in the half that is divided by comb-like incisions has a thickened part extending in the longitudinal direction of the band over the breadth area that is used respectively for stamping out the extension lips and for bending them outwards, so that these lips are thicker than the thickness of the cross-bands.

In this way the advantage is gained that a lattice embodiment can be obtained in which the bands and cross-bands are provided with fixing lips or extension lips which are bent outwards into the correct position, which bands and cross-bands are assembled, this being followed by spot welding of the fixing lips, after which the ends of the thickened extension lips are mechanically finished by milling or grinding, using a milling cutter or a grindstone having the same diameter as the fissile rod, or by spark-erosion so that the extension lips are given ends which are precisely matched with the surface of the fissile rod.

For clamping the fissile rods use is made of plate springs of the multi-arched type. This kind of plate spring has a spring characteristic which brings about a very constant and even pressure which is practically independent of the degree of impression.

As the lattice with a thickened part in one set of the mutually parallel bands is asymmetrical in form, the best way is to introduce plate springs into it which are likewise asymmetrical. For this purpose preference is given to asymmetrical springs of the so-called brassiere type, also termed amazon springs.

Figure 2:
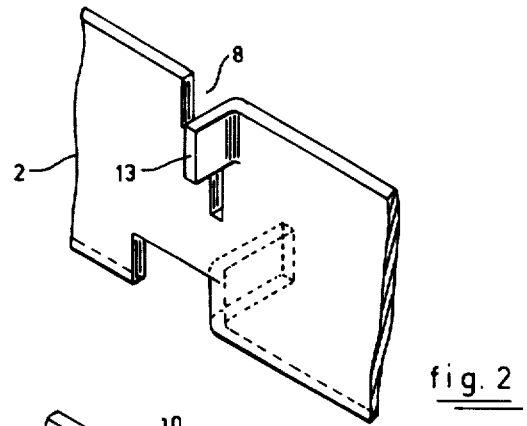
Figure 3:
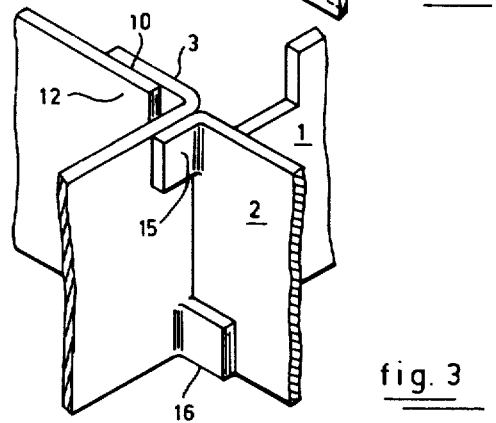

In the following figures a number of typical embodiments of the invention are further elucidated. These figures give views as follows:

FIGS. 1, 2, 3: an illustration in perspective of two intersecting bands as seen when assembled (FIG. 3) and when taken apart (FIGS. 1 and 2).

Figure 4A:
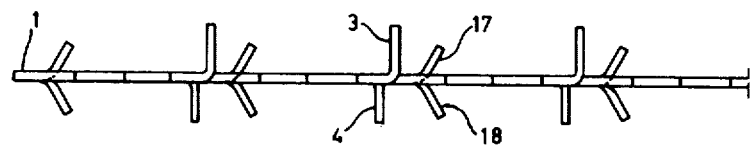
Figure 4:
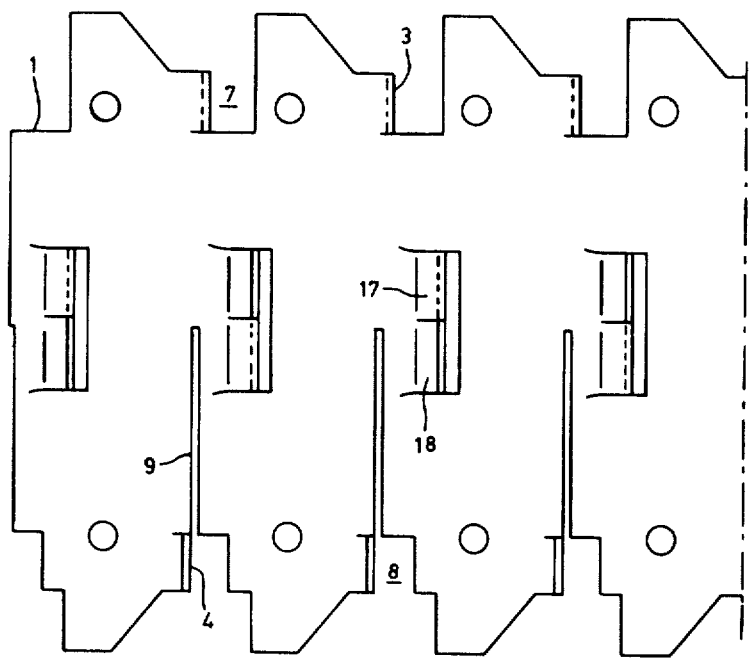

FIG. 4: a side view of a comb strip having outwardly bent extension lips.

FIG. 4a: a top view of the comb strip of FIG. 4.

Figure 5A:
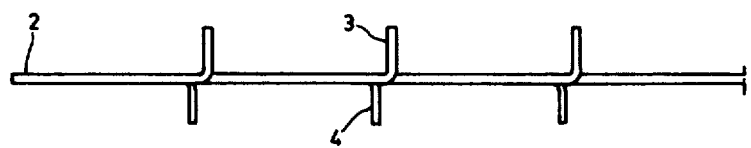
Figure 5:
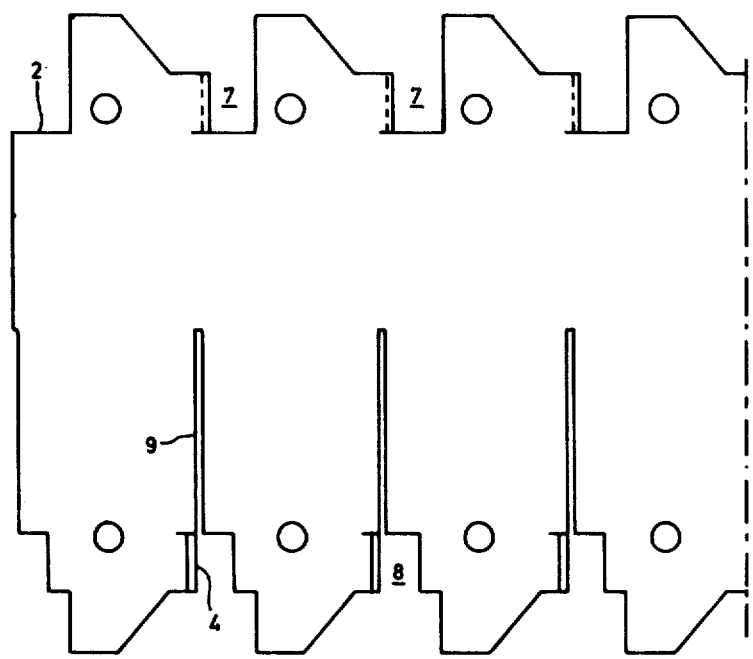

FIG. 5: a side view of a comb strip without extension lips.

FIG. 5a: a top-plan view of the comb strip of FIG. 5.

Figure 6:
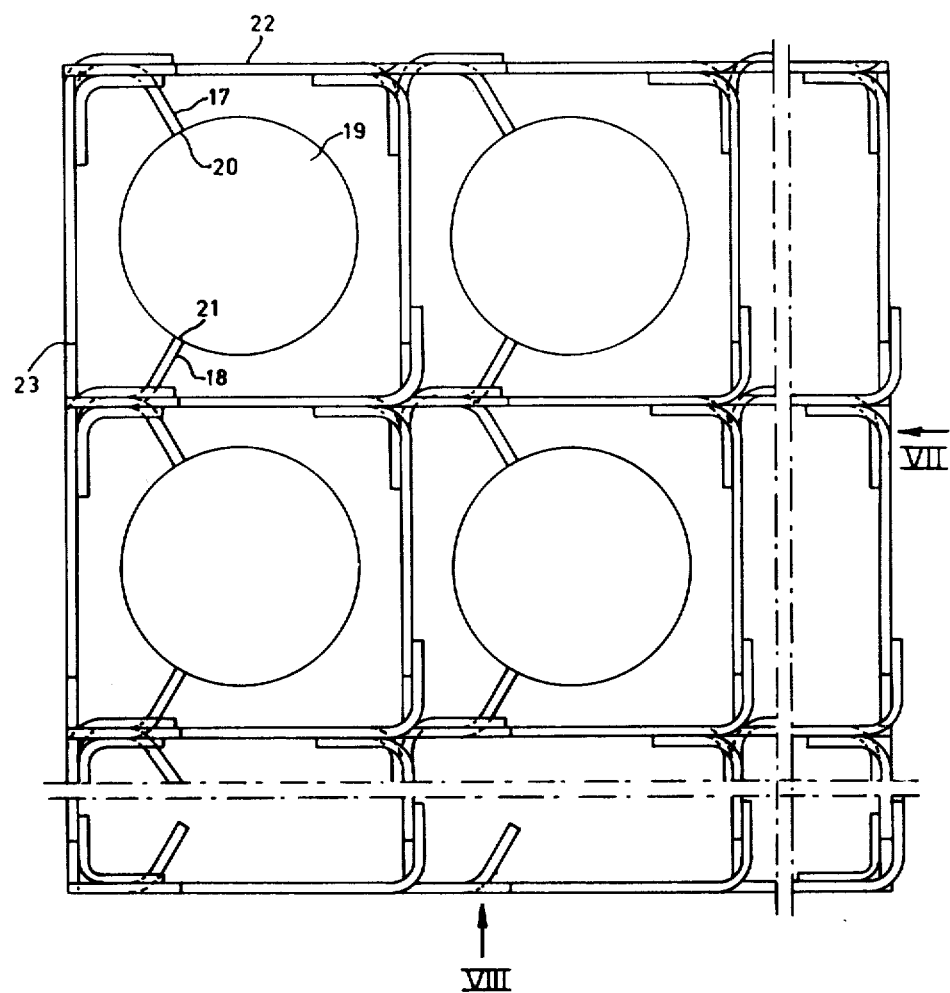

FIG. 6: a top-plan view of a lattice according to the invention.

Figure 7:
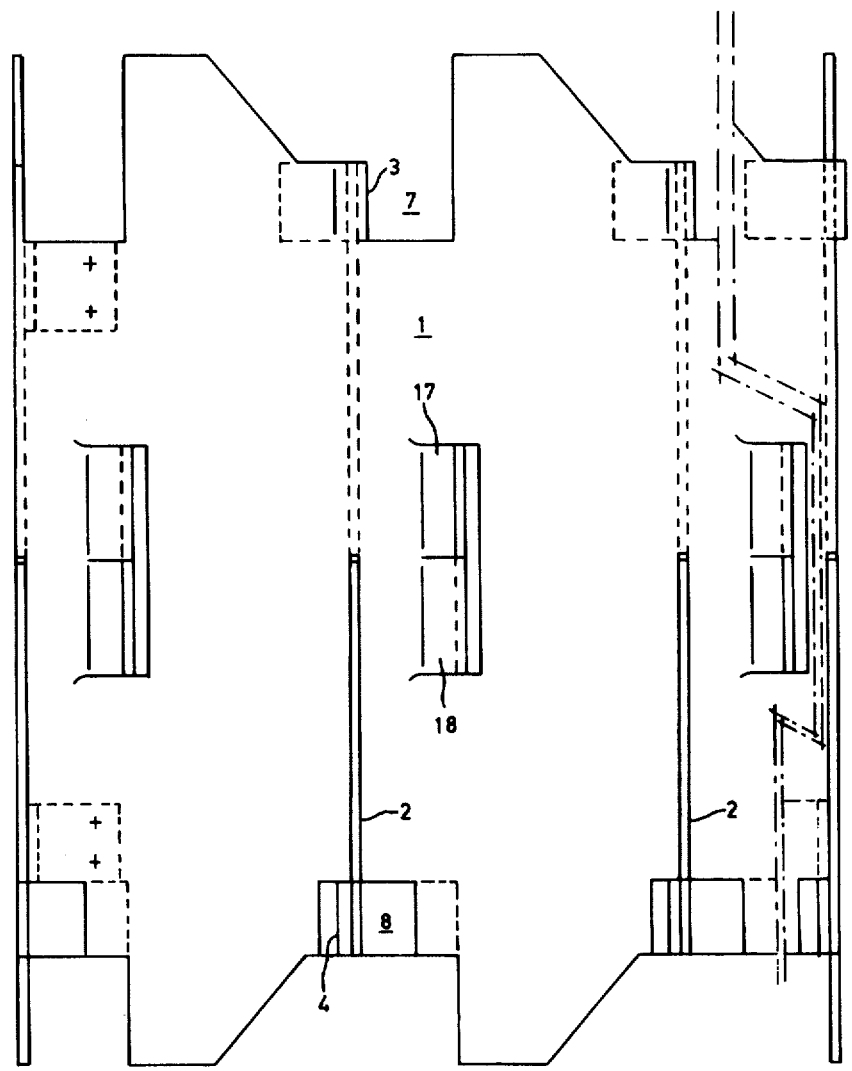

FIG. 7: a side view according to VII of the lattice of FIG. 6.

Figure 8:
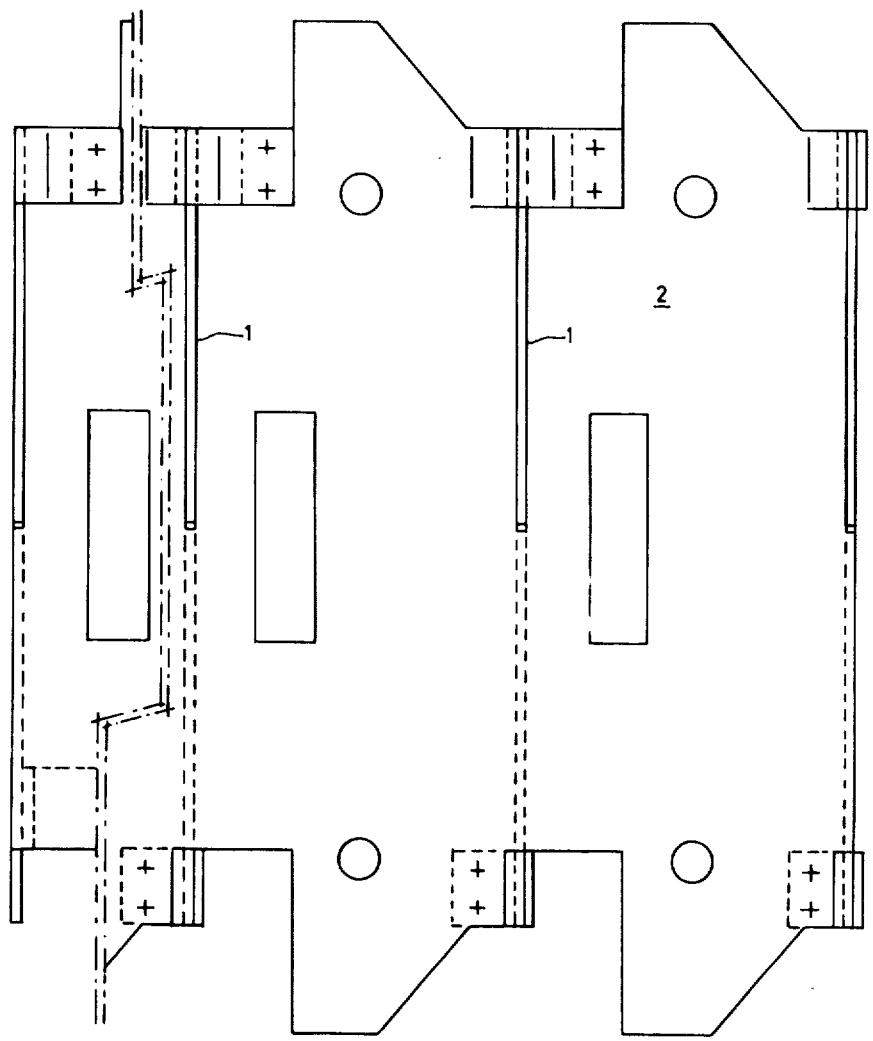

FIG. 8: a side view according to VIII of the lattice of FIG. 6.

Figures 9, 9A:
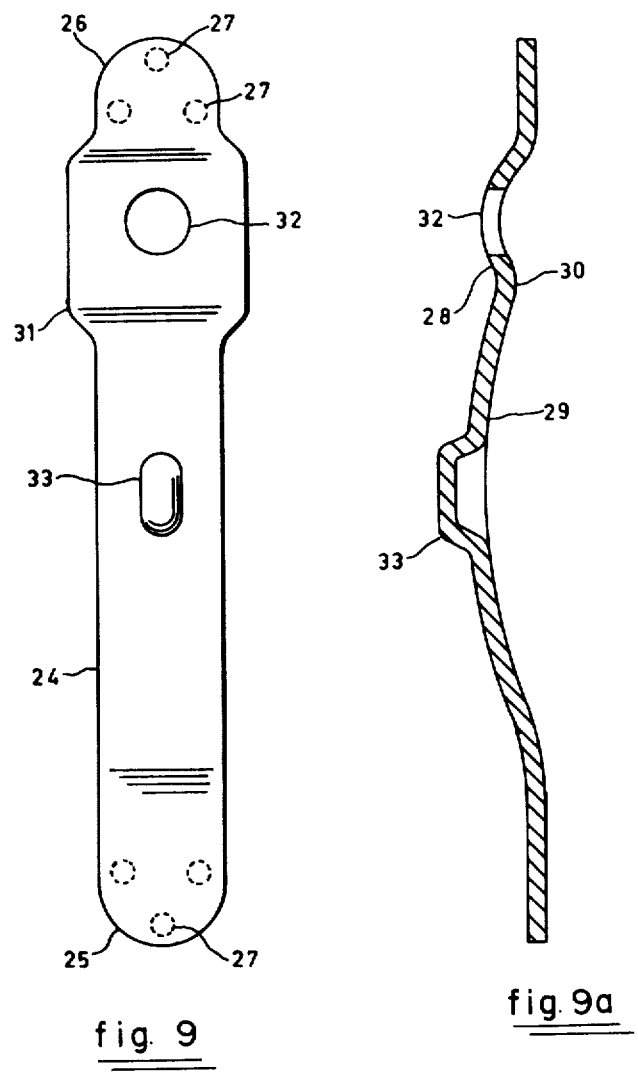

FIG. 9: a side view as well as a vertical cross-section

FIG. 9a: a vertical cross-section of the amazon spring of FIG. 9.

FIG. 10: a vertical cross-section of a lattice cell of the asymmetrical type.

FIG. 11: a top-plan view of the lattice cell of FIG. 10.

FIG. 1 illustrates a part of a cross-band 1 as constructed at the point at which it intersects another cross-band 2 (see FIG. 2). The cross-bands, hereinafter also termed comb strips, are provided with long, outwardly bent lips 3 and with short, outwardly bent lips 4. Lips 3 and 4 are in each case positioned on oppositely situated edges 5 and 6 respectively of the comb strip and are also bent in different directions. The long strip 3, when bent outwards, produces a cavity 7, whilst at the short strip a cavity 8 is formed. Starting from this cavity 8 an incision 9 is provided in the comb strip, this incision being of such a breadth that the other comb strip 2 fits exactly into it.

On comparing FIGS. 1 and 2 it can be seen that FIG. 2 has fundamentally the same shape as the comb strip of FIG. 1 but is in an inverted position as compared with 1. FIG. 3 shows that it is possible to make the comb strips of FIGS. 1 and 2 fit into each other by moving strip 1 downwards over the comb strip 2. As the longest outwardly bent lip, extending through recess 8 of strip 2, is bent to the left, an attachment surface 10 is formed between the inner side 11 of lip 3 and part 12 on strip 2. At the same time a second fixing position is formed between lip 13 of comb strip 2 and part 14 of comb strip 1. Consequently it is also possible to provide a spot welding joint at 15 as well as at 12. The same applies to the fixing positions situated on the underside 16 of the point of intersection referred to.

In this way four spot welding joints can be made at each point of intersection of a set of comb strips 4, so that a very firm construction is obtained.

FIG. 4 shows a comb strip 1 in vertical side elevation in which the parts already mentioned are denoted by the same reference numerals. In the middle of this comb strip, extension lips 17 and 18 are, however, this time also bent outwards on either side. These lips serve for laterally supporting the fissile rods which one might wish to pass through this lattice as illustrated in FIGS. 6 and 11 respectively, which will hereinafter be reviewed. FIG. 5 as well as the associated FIG. 5a give a side view and a top-plan view of the comb strip 2, which is constructed in the same way as comb strip 1, it being understood that the extension lips in comb strip 2 are omitted. FIG. 6 shows in a top-plan view how a lattice will appear after it has been assembled from the comb strips 1 and 2 already described. Numeral 19 denotes fissile rods which are supported at 20 and 21 by the extension lips 17 and 18 already mentioned. On its outer side the lattice is bounded by the side walls 22 and 23.

FIG. 7, representing a side view of the lattice of FIG. 6 according to arrow VII, will need no further explanation, as is also the case with FIG. 8, in which the other side view is illustrated according to arrow VIII. FIG. 9 shows an asymmetrical plate spring of the type also termed an amazon spring. This plate spring 24 is attached at its ends 25 and 26 to a comb strip by means of spot welds 27. The plate spring has a double arching which consists of a small arching 28 followed by a larger arching 29.

Both archings are bent outwards to the same side of the plate spring. The plate spring is for this purpose shaped in such a way that the transitional part 30 is situated a certain distance away from the wall of the comb strip.

In the small arching 28 a broadened part 31 is incorporated in the middle of which an aperture 32 is provided. This aperture makes it easier for the coolant current which is propelled through the nuclear reactor to reach every part of the plate spring so that good cooling of the plate spring is ensured. Approximately at the centre of the large arching 29 a bulge 33 is provided which is used as a contact surface that remains in touch with the fissile rod.

FIG. 10 illustrates, in a cross-section of one cell of the lattice, how a fissile rod 19 is supported by the amazon spring 24 already described. On the opposite side of the lattice cell 34 the fissile rod 19 is supported by two bent extension lips 35 and 36. These lips have a larger thickness than the comb strip 2, because the comb strips 37 which intersect strips 2 are in this case provided with a thickened band 38 which forms an integral part of each strip 37. FIG. 10a shows this in a vertical cross-section of comb strip 37. The extension lips 35 and 36 are stamped out and bent outwards from this thickened part 38. As the extension lips 35 and 36 now have a larger thickness, it becomes possible, after the bending outwards and the assembly of a fissile lattice, to grind the ends of the extension lips to the required shape. This is preferably effected by making use of a multi-spindle grinding machine containing a plurality of small grindstones each of which has the external dimension of a fissile rod, which grindstones are fitted in the grinding machine in the same position with respect to each other as that in which the fissile rods are mounted in the fissile lattice. In this way it is possible, in one and the same working cycle in which the grindstones are passed through the lattice, to grind all the extension lips precisely in such a manner that circular surfaces 39 and 40 are formed at the ends of the extension lips. These surfaces correspond exactly with the curvature of the fissile rod 19, so that perfect contact between the extension lip and the surface of the fissile rod is achieved.

We claim:

1. A lattice constructed of a set of parallel elongated first strips residing in a given plane and a set of parallel elongated second strips also residing in said plane, said sets of first and second strips intersecting and engaging at a plurality of complementary spaced-apart incisions each of which extends from one edge of each strip toward the opposite edge of the respective strip, whereby said sets of strips form compartments, each edge portion of each strip having a lip stamped out of the material of the strip at the intersection points so as to extend parallel to the respective intersecting strip, said lip engaging the respective intersecting strip and being secured thereto, the strips of at least one of said sets each having at least two extension lips bent outwardly on either side at locations between incisions for the purpose of engaging objects in the compartments, those parts of the strips from which said extension lips are bent out being of thickened construction so that the thickness of said extension lips is greater than the thickness of the strips of the other set.

2. A lattice as in claim 1 including in each compartment a plate spring of the multi-arched brassiere type fitted to one of said strips opposite the ends of said extension lips.

3. A lattice as in claim 1 including in each compartment a plate spring of the asymmetrical brassiere type fitted to one of said strips opposite the ends of said extension lips.

4. A lattice as in claim 1 including a cylindrical fissile rod disposed in each compartment.

* * * * *